April 5, 1955

J. W. HENDRY 2,705,343

UPWARDLY EJECTING INJECTION MACHINE
WITH PLASTICIZING CHAMBER

Filed Oct. 31, 1951

INVENTOR.
JAMES W. HENDRY
BY

April 5, 1955

J. W. HENDRY 2,705,343

UPWARDLY EJECTING INJECTION MACHINE
WITH PLASTICIZING CHAMBER

Filed Oct. 31, 1951

INVENTOR.
JAMES W. HENDRY

BY

April 5, 1955 — J. W. HENDRY — 2,705,343
UPWARDLY EJECTING INJECTION MACHINE WITH PLASTICIZING CHAMBER
Filed Oct. 31, 1951 — 5 Sheets-Sheet 5

INVENTOR.
JAMES W. HENDRY

United States Patent Office 2,705,343
Patented Apr. 5, 1955

2,705,343

UPWARDLY EJECTING INJECTION MACHINE WITH PLASTICIZING CHAMBER

James Watson Hendry, Bay City, Mich., assignor, by mesne assignments, to Tube Turns Plastics, Inc., Louisville, Ky., a corporation of Delaware Application October 31, 1951, Serial No. 254,113

22 Claims. (Cl. 18—30)

This invention relates to injection molding machines and particularly to a type thereof having a pre-plasticizing chamber discharging into an injection chamber and wherein said injection chamber discharges in an upwardly direction into a mold.

In previous injection equipment utilizing a pre-plasticizing unit, as illustrated by my application Serial No. 93,935 or by Patent No. 2,501,595, there are present a number of problems which effect certain difficulties in the construction, operation and maintenance of the equipment. Even though such problems can be handled, and generally speaking do not prevent said machines from performing desirable and worthwhile jobs of injection molding, nevertheless, the problems exist and a more efficient and economical machine would be provided if they could be eliminated.

Most of these problems are common to both the vertically downward injection machine, as illustrated in my application Ser. No. 93,935 and to the horizontally arranged machine, as illustrated in Patent No. 2,501,595 to Bonhannon or in Patent No. 2,359,840 to Goessling, but inasmuch as such problems are, in the main, more severe in said downwardly acting machine, they will be discussed with primary reference thereto.

For example, in a downwardly directed machine, the cylinder driving the injection ram is placed at a considerable distance from the base of the machine, or from the floor supporting said machine, such as a matter of 25 or 30 feet in some of the larger installations. This provides a real problem of effecting the necessary hydraulic connections to said cylinder from the pressure equipment which is usually located on or below said floor or base, which problems manifest themselves primarily as problems in maintenance and repair.

By constructing the machine as hereinafter described in more detail, this cylinder is brought to a position closely adjacent said hydraulic equipment and this piping problem is materially reduced and the principal difficulties arising from this source are fully eliminated.

Further, in a machine of the vertically downwardly ejecting type, there arises, particularly in the larger installations, a serious problem originating in the inevitable stretching of the strain rods which occurs when the device is in the injection step of its operating cycle and is under substantial pressure as result thereof. Where the pre-plasticizing chamber is mounted on the base of the machine but its discharge nozzle is connected into and through a wall of the injection chamber, a relative movement occurs between said pre-plasticizing unit and said injection chamber which places a severe strain thereon, and sometimes seriously jeopardizes the operating efficiency of the machine. However, with an upwardly ejecting machine as hereinafter described, said pre-plasticizing chamber and said injection ram are both mounted directly and independently upon the base of the machine and the part moving as a result of the stretching of the strain rods is only the mold holding structure which can be readily adapted for moving separately and without disturbing the structural unity of the device.

Still further, and probably the most serious problem of all, and one which substantially equally affects the vertical and the horizontal type of machine, is the problem of eliminating the voids created in the plastic material upon delivery thereof into the ejection chamber. These voids are caused when material discharged from the pre-plasticizer coils upon itself as it fills the ram chamber. Since the interior of the ram chamber is a vacuum, these voids have no air, or other gas, in them and may be termed "vacuum voids." Nevertheless, the stiffness of the plastic material is such that the elimination of the voids so formed requires considerable pressure and sometimes even with substantial pressure applied the voids still exist and the material reaching the nozzle and the ram is subjected to erratic and rough action. However, with the material being ejected upwardly and thereby introduced into the ram chamber at the lower end thereof, the initial introduction of material into said chamber will fill the portion immediately in front of the inlet port thereof and prevent the coiling above mentioned. Accordingly, by such a device the material filling the injection chamber will be homogeneous and free from voids.

A further problem, closely related to the one discussed in the preceding paragraph but nevertheless a separate problem, is the fact that in the downwardly operating vertical type of machine, and to a lesser extent in the horizontal type of machine, the material tends to flow by gravity out of the discharge nozzle. Thus, the injection chamber will be filled by the screw or ram in the pre-plasticizing unit and a high degree of pressure built up therein which will diminish the above mentioned vacuum voids within the plastic material. However, if the machine stands for any appreciable length of time before the injection stroke is initiated, the material will tend to move by gravity out from the nozzle and thus both cause a slight extension from said nozzle, which will need to be manually broken off before the mold can be closed and the injection step initiated, and it will also tend to relieve the pressure within the ram chamber and thus permit the material in some cases to spring back and the voids again open. By ejecting upwardly, the weight of the plastic material in the ram chamber is added to the pressure on the zone adjacent the inlet port into the ram chamber, rather than being subtracted therefrom, the tendency to drool is minimized and the pressure tending to hold the material homogeneous and the voids closed is increased.

A still further problem exists in the handling of thermoplastic materials in that the material in the immediate region of the nozzle in a conventional vertical or horizontal machine comprises a cold slug which will either create an undesirable condition in the molding or must in the injection process be led into a portion of the mold where it can be disposed of, and thus it creates an element of waste. By ejecting upwardly, this tendency for the material to run out is eliminated and heaters may be provided at the extreme tip of the nozzle and the material therein be thereby kept always soft and readily moldable. This further eliminates the problem of drooling, and simultaneously eliminates the necessity of a cold slug and choice between an inferior product or waste of material necessitated thereby.

Accordingly, I have created and herewith disclose a machine in which the injection is effected in an upwardly direction and by which the above recited problems are eliminated and the above indicated advantages obtained. The particular structures and concepts by which these broad objectives are obtained are set forth in detail below.

A principal object of the invention is to provide a plastic injection machine wherein the ejecting from said machine and the injecting into the mold is done in a vertically upward direction.

A further object of the invention is to provide a plastic injection machine which may be compactly built.

A further object of the invention is to provide a plastic injection machine, as aforesaid, in which lengthy runs of piping carrying pressure fluid under relatively high pressures are avoided.

A further object of the invention is to provide a plastic injection machine of the type aforesaid in which the material being handled is maintained in a uniform and homogeneous mass and free from the formation of vacuum voids.

A further object of the invention is to provide a plastic injection machine, as aforesaid, in which the cold slug is entirely eliminated.

A further object of the invention is to provide a plastic injection machine, as aforesaid, which will utilize efficiently all of the plastic supplied thereto.

A further object of the invention is to provide a plastic injection machine, as aforesaid, in which the plastic material in the region of the ejection nozzle may be kept constantly heated and the plastic material therewithin kept always soft and readily moldable.

A further object of the invention is to provide a plastic injection machine, as aforesaid, in which the pre-plasticizing unit and the ram chamber may be mounted independently of each other but rigidly with respect to each other, on a base and wherein the yielding of the mechanism at the time of injection due to the stretching of the strain rods will not result in undesirable mislocation or misalignment between said pre-plasticizing unit and said ram chamber.

Other objects and purposes of the invention will become apparent to persons acquainted with apparatus of this general type upon reading of this disclosure and inspection of the accompanying drawings.

General description

In general, the apparatus contemplated by the present invention includes a base member, an injection cylinder positioned for ejection in a generally upward direction and having its ram operating from the bottom thereof in an upward direction on the pressure stroke, together with a pre-plasticizing unit which is independently mounted on said base and which supplies pre-plasticized material to the ram chamber at a point immediately above the face of said ram when said ram is in its lowermost position. The lower mold platen is mounted immediately adjacent the nozzle of said ram cylinder. The lower platen, while in fixed relation with respect to the ram cylinder for any given injection cycle, may be adjusted vertically upwardly or downwardly as desired to enable the apparatus conveniently to receive molds of different sizes. The upper, or movable, mold supporting platen is provided with mechanism by which its initial travel toward and away from fully closed position is done at a rapid rate of speed and the final mold closing and the clamping operations, together with the operation of breaking the mold open after the plastic has cooled, is done more slowly under greater pressure.

Construction in detail

The principal parts of the apparatus here in question include a base 1 on which is supported a pre-plasticizing unit 2 and a ram chamber assembly 3. The pre-plasticizing unit communicates at 4 with the interior of said ram chamber. A conventional hopper 5 feeds plastic material to the pre-plasticizing unit and a pair of mold supporting platens 6 and 7 are supported in operative position with respect to the ram cylinder. The upper platen 7 is movable under the influence of mechanism within the mold actuating housing B and is supported on the base 1 by the strain rods 9.

Turning now to the parts in more detail, the base 1 is fabricated in any convenient manner but is sufficiently rigid to provide a solid and reliable support for the remainder of the apparatus.

In the preferred embodiment here illustrated, said base 1 consists of a bottom plate 10, a top plate 11, one end plate 12 and a further end plate 13. These are fabricated together by riveting, welding or other convenient fastening means to form a generally rectangular box for supporting the mechanism.

The said strain rods 9 rest on the upper plate 11 of said base. Their lower ends are each respectively fastened by suitable nuts, as shown at 161 and 162, to the upper ends of suitable box-shaped structures formed, or otherwise provided, in the sides and corners of the base 1, as at 163 and 164.

The pre-plasticizing unit 2 includes a substantially cylindrical tube 20, defining a pre-plasticizing chamber 17, and having a discharge nozzle 21 and an inlet 22. A screw 23 is within said cylinder and is provided with the screw flights 24. This screw may be of any conventional shape but will be found entirely satisfactory if made in either of the forms shown in my application Serial No. 93,935 or in my application Serial No. 241,577. Inasmuch as fully operated and desirable screws are described in detail in each of said applications, further detailing thereof here is unnecessary and will be omitted.

Suitable heating units 25, of any conventional type, are placed along the outside of said cylindrical tube 20 for effecting heating of said plastic as set forth in detail in either of my applications Serial No. 207,495 and Serial No. 236,803.

Said pre-plasticizing unit 2 is supported upon any suitable frame structure, as the frame element 30 directly onto the base 1. The screw 23 is driven through any convenient coupling 32 by the belting assembly 34 from the magnetic clutch 35, one side of which in turn is continuously driven by the motor 36.

Turning now to the ram chamber assembly there is first provided a ram chamber housing 40 having therein a ram chamber 41 in which operates the ram 42. Said ram chamber housing is mounted upon the platform support 44 which may conveniently comprise upper and lower plates 45 and 45a which are spaced with respect to each other by end plates 46 and 46a. The cap 47 on the lower end of the ram chamber assembly tightly grips said ram chamber tightly against the upper plate 11 and holds said platform support assembly tightly against the upper side of said upper plate.

The ram 42 is actuated by a ram pressure cylinder 48, preferably hydraulic, which is supplied through the pressure fluid lines 49 from means described further hereinafter.

An actuating element 50 associated with the ram plunger 42a cooperates with limit switches 183 and 184 (Fig. 4) in a manner hereinafter described in further detail for effecting actuation of said ram.

Figure 1:
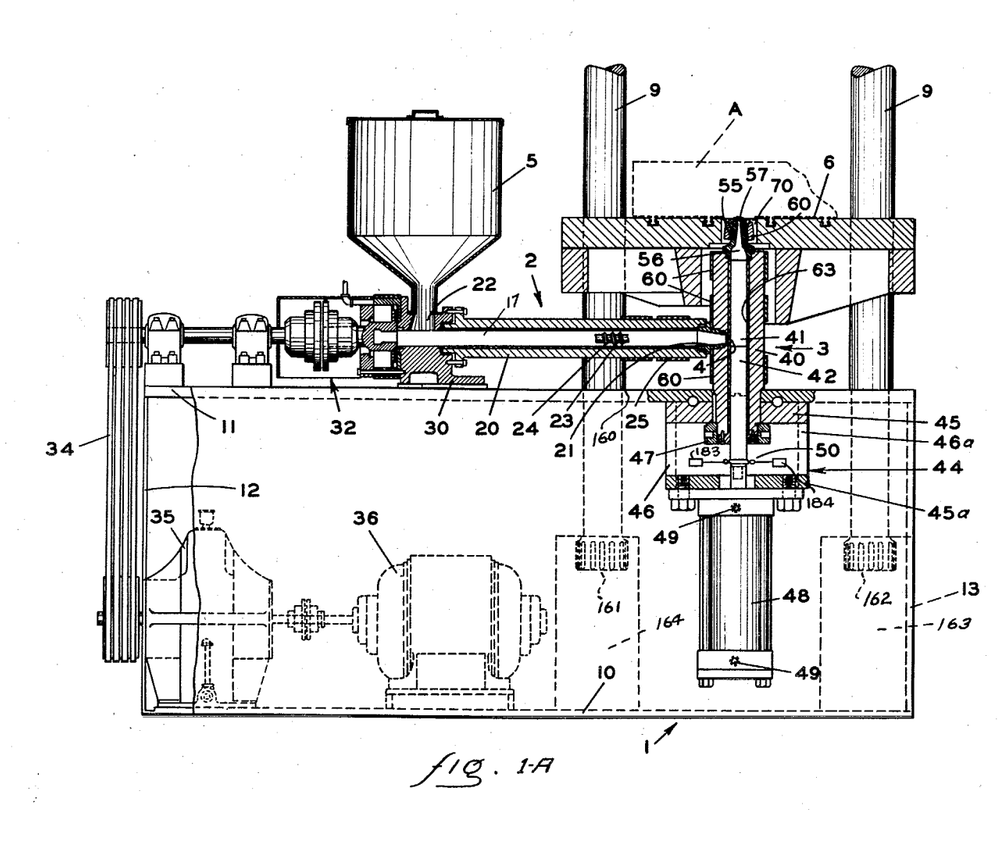
Figure 1A is a vertical elevation in central section, partially schematic, of the lower portion of an injection molding apparatus built in accordance with the present invention.
Figure 1B is a vertical elevation in central section, partially schematic, of the upper portion of an injection molding apparatus built in accordance with the present invention.

A nozzle 55 (Figs. 1 and 2) is placed at the upper end of the ram chamber housing in communication with said ram chamber and is adapted for insertion into a mold of a conventional type, the lower portion of which is partially indicated by the letter "A." The discharge passageway 56 within said nozzle has a narrow throat 57 in a conventional manner and for conventional reasons.

The heaters 60 are provided surrounding the ram chamber and the nozzle for keeping said plasticized material at the desired temperature but it will be noted that, contrary to conventional practice, the heaters here extend to a point between said narrow throat and the tip 61 of said nozzle.

Said heaters are energized and controlled, preferably thermostatically, by conventional means.

To prevent said ram from binding on the walls 63 of said ram chamber 41, said heaters extend the greater part of the length of said ram chamber and, further, said ram chamber may be provided with an offset in the same manner as described and illustrated in detail in my application Serial No. 93,935.

The lower platen 6 is guided on the strain rods 9 and has a central opening 70 therein through which the nozzle 55 extends. Said platen is adjustably supported in a selected position with respect to said nozzle by any convenient means, as wedges, not shown.

The upper mold supporting platen 7 is supported near the upper ends of said strain rods 9. Said strain rods pass through suitable openings 81 in said upper platen 7. Located above said upper platen 7 are upper support plate elements 82 which rest on the inset portions 83 of the strain rods 9 and are held in place by the nuts 84. Said upper support elements support the assembly B by which the upper platen is moved vertically on the strain rods for opening and closing the mold. Said assembly may comprise a variety of specific items of apparatus, some of which may be conventional, but in a preferred embodiment I have utilized the mechanism which will now be described.

A clamp cylinder 85 defines a platen moving chamber 86 in which is located the upper platen clamp piston 87. Said clamp piston is connected to said upper platen 7 by the rod 89. Suitable inlet and outlet conduits 92 and 93 are respectively connected with the chamber 90 above said piston and into the chamber 91 below said piston, and further connect to suitable means for supplying hydraulic fluid under pressure.

Figures 1, 3:
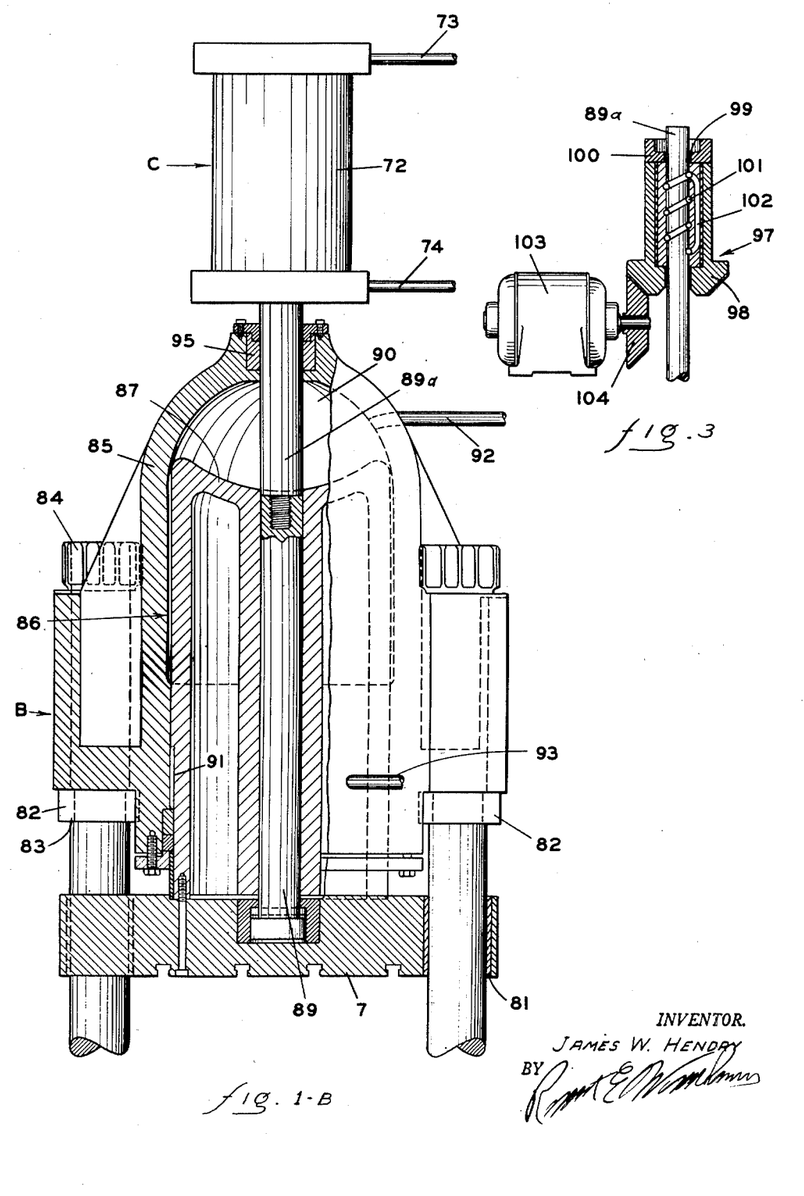
Figure 3 is a vertical elevation, partially in central section, showing a modified form of apparatus for operating the movable, or upper, mold supporting platen.

The rod 89a extending upwardly through the clamping piston and through the opening 95 is affixed to any convenient means C for moving it upwardly and downwardly independently of the motion of the clamping piston. Thus, the upper plate may be moved toward the lower platen at a rapid rate of speed under relatively light force by the means C connected to said rod 89, and then the mold closed and clamped under the force of the clamping piston 87 under relatively great force, and the opening of the mold may be effected first by a relatively great force in order to break same loose and then completed by a relatively light force. As shown in this embodiment the relatively light force applied to the rod 89 for moving it at a higher rate of speed than that at which the clamping piston is moved is applied by a suitably designed hydraulic cylinder as shown in Figure 1B but said hydraulic cylinder may be replaced by mechanical apparatus as shown in Figure 3. The use of such mechanical apparatus adapts the mechanism for slightly different requirements but does not change the overall combination.

In this embodiment, there is provided a hydraulic cylinder 72 of diameter relatively small with respect to the clamp cylinder 85 having connections 73 and 74 in each end thereof for the inflow and outflow of hydraulic fluid. Thus, pressure fluid may be admitted at 73 into the upper cylinder and, since said upper cylinder is of relatively small diameter, said pressure fluid will drive the piston thereof and the rod 89a downwardly at a relatively rapid rate. When the molds carried by the platens approach closely together, then the pressure fluid is admitted into the clamp cylinder 85 which, being of much greater diameter will move said molds downwardly under the same fluid pressure with relatively greater force but at a slower rate to clamp the molds closed. When the molding process is completed, pressure fluid is introduced into the lower end of the clamp cylinder 85 which will exert a relatively great force to break the molds free from each other after which the fluid may be directed into the upper cylinder and the molds open rapidly. Alternatively, pressure fluid may be introduced to the lower sides of both cylinders simultaneously but at a somewhat higher rate in order to break open the mold under somewhat greater pressure than will be required for lifting said upper platen but by which the rate of opening may be somewhat more rapid than is the rate of closing and clamping the mold under the action of the clamping cylinder alone.

While the foregoing disclosed specific embodiment of my invention will be operable with any hydraulic system of conventional type and which may be supplied by anyone skilled in the art in view of the disclosure thus far made, I will describe hereinafter one specific hydraulic system which has been found very satisfactory for operating the mechanism above described and wherein lie certain further advantages not previously attained.

In this particular embodiment (Figs. 4 and 5) the pump 110 is driven by the motor 111. Said pump is of a variable output which may be controlled by shifting vanes within said pump in a conventional manner under the control solenoids 112, 113 and 114 (Fig. 5) or said output may be controlled in any other conventional form including means for varying the speed of said motor 111. In this particular embodiment it will be assumed that the solenoid 112 will effect a rapid output, the solenoid 113 will effect an intermediate output and the solenoid 114 will effect a slow output, all assuming a constant speed motor.

Said pump 110 is connected by the conduit 115, through one port of the solenoid controlled valve 116 and the conduit 117 to the lower end of the upper cylinder 72. A conventional counterbalance valve 175 is placed in the conduit 117. Another port of said valve 116 is connected to the upper end of the upper cylinder by conduit 118, and the fourth port 119 of said valve is connected to the return side of said pump.

The pump 110 is also connected by the conduit 120 to the first port of the solenoid controlled valve 121 and through a second port thereof by the conduit 122 to one end of a hydraulic cylinder 123a controlling a pre-fill valve 123. A further port of said valve 121 is connected by the conduit 126 to the other end of the cylinder 123a. Said pre-fill valve 123 is interposed between the conduits 124 and 92 connecting a reservoir 125 to the upper end of the chamber 86 of the clamp cylinder 85. The conduit 93 connects the lower end of chamber 86 with the conduit 117.

A check valve 133 and a needle valve 134 are connected in parallel between said pre-fill valve 123 and the conduit 122. A solenoid controlled valve 142 is in series with the needle valve.

A conduit 127 is connected from a point between the check valve 133 and the valve 142 through a solenoid controlled storage control valve 170, and the check valve 181 which is connected in parallel therewith, to the accumulator 128. Said accumulator may be of any conventional type, as a common air-dome or a housing containing an expandible bag which expands against a spring. A pressure switch 182 is connected with the accumulator to react to pressure therein and is further connected with the storage control valve 170 to close said valve when the pressure in the accumulator is below a pre-selected level. Other control means, not shown, are provided to open said storage control valve at the same time the valve 121 closes off pressure from the pump to the clamp cylinder.

Figures 4, 5:
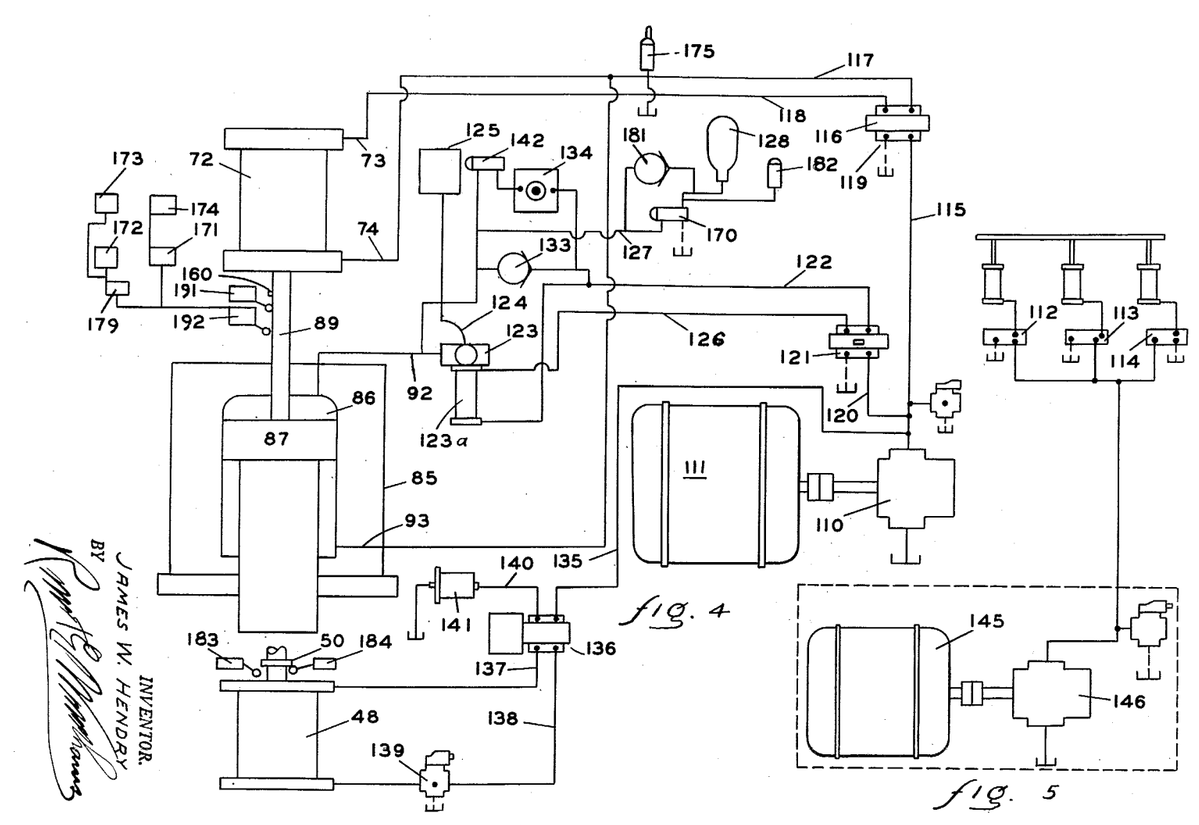
Figure 4 is a schematic showing of a hydraulic system which will effectively operate the mechanism shown in Figure 1.
Figure 5 is a further detail of the hydraulic system.

The pump 110 is also connected by the conduit 135 to the first port of an electrically controlled valve 136, and thence through a second port thereof by a conduit 137 to the upper end of the ram cylinder 48. A third port of valve 136 is connected by conduit 138 to the lower end of said ram cylinder 48 through a by-pass valve 139. The fourth port of valve 136 is connected by a conduit 140 through a relief valve 141 and back to the tank. As shown in Figure 5, a small motor 145 drives a pump 146 to provide fluid pressure for shifting the output volume control mechanisms in the pump 110 under the control of the solenoids 112, 113 and 114.

Although the conduits 92 and 93 are here relatively long, in that they must reach from the base to the upper end of the machine, they carry substantially less pressure than the conduits supplying the hydraulic pressure cylinder 48 and hence the maintenance problems are considerably lessened over those encountered in a downwardly ejecting machine.

*Operation*

Raw plastic is placed into the hopper 5 and is fed into the pre-plasticizing unit 2. In said pre-plasticizing unit, the material is heated, mixed, mulled and worked, and is then discharged by said unit through the opening 4 into the chamber 41 of the ram cylinder. By discharging into the bottom of said chamber, with said ram in its lowermost position, the coiling of the plastic material is avoided, the material is formed continuously and substantially without voids in the bottom of the chamber and pushes upwardly in a substantially homogeneous condition. When the chamber is filled to the desired point, the weight exerted by the plastic material onto the ram moves it downwardly sufficiently to trip the micro-switch 183 to terminate such filling. Other means, described in more detail hereinafter start the flow of pressure fluid into the ram pressure chamber 48 on the underside of the ram. This forces the ram upwardly and urges the plastic material out through the throat 57 into the mold.

The opening and closing of the mold is preferably done automatically and will be timed by any convenient means, as shown, with respect to the operation of the ram.

As the ram injects plastic material into the mold the force thereof is taken up by the strain rods 9 but the stretching of said strain rods tends only to open the mold or to pull it away from the nozzle. This movement is sufficiently slight, and compensation therefor can readily be made, so that it is inconsequential. There is, however, no tendency for movement between other parts which must necessarily remain in matched relationship, such as the preplasticizing unit 2 and the ram chamber assembly 3. Rather, with this construction, both the ram chamber and the pre-plasticizing unit are connected rigidly to the base and regardless of the pressure developed by the ram cylinder there can be no relative movement between these parts.

Further, it will be noted that by virtue of the nozzle 55 being directed upwardly, there is no tendency for the softened plastic material to run out therefrom during a non-injecting portion of the operating cycle. With this construction, the heaters 60 can extend beyond the narrow throat 57 of the nozzle to a point between said narrow point and the uppermost limit thereof and thus keep the plastic material warm and soft throughout the entire molding operation. Thus, there is eliminated both the problem of the conventional cold slug and also the problem of drooling.

The more detailed operation of the machine is shown by the following description of the operation of the hydraulic system. Reference will be made during this description, to various switches and timers which are not shown in detail in this disclosure, but whose structures and operation will be sufficiently obvious in the light of the description hereinafter given that it can be supplied by any person skilled in the art and to give more than schematic indication of such would be superfluous.

After the machine has been started, a given cycle commences with the upper platen in the upper position, the ram in its lower position, and the injection cylinder filled with pre-plasticized material ready for injection into the mold.

The operator presses a pair of conventional safety switches (not shown) for starting and energizing the motor 111 and pressure fluid commences to flow from the pump 110. The valve 136 being closed to the conduit 135, the pressure fluid first flows through the valve 121 into the conduit 126 and opens the prefill valve 123. This permits unobstructed flow of pressure fluid from the tank 125 through the conduits 124 and 92 into the chamber 86 of the clamp cylinder 85. After the pre-fill valve has opened, conduit 124 then becomes a static line and the pressure fluid flows through the conduit 115 through the valve 116 and through the conduit 118 to the upper end of the cylinder 72 and thereby moving the rod 89a and with it the upper platen 7 down rapidly. As the piston 87 is driven downwardly with and by the rod 89a, it draws oil into the chamber 86 through the conduits 124 and 92 at a sufficiently rapid rate to keep said chamber 86 filled.

When the molds approach closed position, a suitable trip 160 strikes the limit switch 191 and this, through conventional circuitry not shown, actuates the solenoids 112 and 114 by which the delivery of pump 110 is changed from its maximum volume to its minimum volume. This slows the downward movement of the upper mold. The trip 160 then strikes the limit switch 192 and this accomplishes the following things: changes solenoids 114 and 112 to restore the delivery of the pump to maximum, energizes the solenoids operating the valve 121 to change the valve 121 and direct pressure fluid from the conduit 120 through the conduit 122 and thereby close the pre-fill valve 123a. Pressure fluid flowing through conduit 122 also flows through check valve 133 and into the conduit 124 for filling the chamber 86. With the pre-fill valve closed, the pressure fluid from conduit 122 cannot back through the conduit 124 into the reservoir 125, but will enter the chamber 86 under the full pressure of the pump 110. Pressure fluid will also flow from the conduit 122 through the conduit 127 and the check valve 181 into the accumulator 128 and will store energy therein. Valve 170 is closed.

Simultaneously with the tripping of the limit switch 192, a closing timer 179 and the clamp timer 171 are both started. As the closing timer times out the valves 121 and 116 are both actuated to terminate flow through both of the conduits 115 or 120 and the valves 136 and 170 are opened. At this point the molds are fully closed and pressure is held on the molds to hold them in closed position from the accumulator 128 acting through the conduits 127 and 92. The solenoids 112, 113 and 114 are now operated by the closing timer to change the pump output from maximum to intermediate.

Pressure fluid from the pump now flows from the line 135 to and through the line 138 into the lower end of the ram pressure cylinder 48 to start same upwardly for an injection stroke. With the timing out of said closing timer 179, and the admission of the pressure fluid into the conduit 138, two further timers are started which may be referred to as an injection timer 172 and a hold timer 173. As the ram moves upwardly and fills the mold, the injection timer times out and actuates a solenoid to shift the solenoids 113 and 114 again to change the pump output from its intermediate quantity to the lower quantity which latter is sufficient for molding purposes. The relief valve 139 permits oil to flow back to the reservoir and thereby enables the pump to hold pressure on the ram until the plastic material has set. When the hold timer has timed out, the plastic material has set and the valve 136 is reversed to direct pressure fluid line 135 into the line 137 and thereby move the ram downwardly. As the ram moves downwardly it first strikes the limit switch 184 and this both shuts pressure fluid off from the line 137 and starts rotation of the extrusion screw 23. The extrusion screw then pushes plasticized material through the port 4 into the ram chamber 41 and fills same. As the ram chamber becomes filled, it pushes the ram downwardly and this pushes pressure fluid out through the conduit 138 to the conduit 140 and against the spring in the spring loaded check valve 141. As soon as the pressure within the ram chamber builds up to such a point that pressure fluid opens the valve 141, it is enabled to move downwardly sufficiently further to trip the limit switch 183. This shuts off the extruder.

The pressure from the accumulator 128 being supplied to the clamp cylinder will leak slowly past the plunger therein and it will accordingly diminish at a slow, but steady rate. However, as soon as the plastic in the mold runners has hardened, the clamp pressure is no longer needed. Therefore, in order to prevent complete dissipation of the pressure in the accumulator and the consequent wastage thereof, the pressure switch 182 closes the storage control valve 170 as soon as the pressure in the accumulator diminishes to a predetermined level and said level is chosen at such a point that the pressure will reach it only after the passage of enough time after the beginning of the injection step that said runners will be hardened. Thus, excessive loss of pressure from the accumulator is prevented. Further, after the storage control valve 170 blocks the accumulator from the clamp cylinder, a more rapid loss of pressure from the clamp cylinder, and this assists the hereinafter mentioned decompression step.

In the meantime, the clamp timer 171 has been running out and will complete its timing period near, but not necessarily with, the filling of the ram chamber. When said clamp timer times out it opens the valve 142 which has been closed prior hereto and also starts a decompression timer 174. With the valve 142 open, pressure fluid from the chamber 86 is enabled to flow through the conduit 92, through said valve 142 and the needle valve 134, through the conduit 122 and through the valve 121 into the tank. This completes the relieving of the pressure in the chamber 86. When this decompression timer has timed out and the pressure within the chamber 86 has been relieved, the valve 121 is fully closed and the valve 116 opens the admit pressure fluid into the line 117. From line 117 pressure fluid is conducted to the lower sides of the pistons in both of the cylinders 72 and 85 and the upper platen is thereby raised.

*Modifications*

Alternatively, the rod 89a extending through the opening 95 in the upper end of the housing 85 may be received into a threaded device which device includes the housing 97 and the bevel gear portion 98. The upper end of said rod 89a passes through a suitable opening 99 in the upper, non-moving portion 100 which is mounted by any suitable means, not shown, non-rotatably with respect to the housing 85. The rod 89a is mounted slidably but non-rotatably with respect to the housing 85. Means are provided, of any convenient sort, in which rotation of the housing 97 will cause upward and downward movement of the rod 89. Suitable means may be provided by ordinary threading or, better, a conventional drive using ball bearings 101 with a return slot 102 may be employed. The bevel gear 98 is rotated in one direction, or the opposite direction, by a reversing motor 103 through the bevel gear 104. The hydraulic driving mechanism, and the control mechanism, will obviously be modified accordingly.

As the mold is about to close, the reverse motor 103 is energized and the housing 97 is caused to rotate rapidly. This urges the rod 89 downwardly rapidly and thereby moves both the upper platen 7, and consequently the upper mold half carried thereon, together with the piston 87 downwardly rapidly. The hydraulic system is so constructed that as the piston moves downwardly rapidly it draws oil into the upper chamber 90 at a rate sufficiently rapid to keep it full. When the mold is a small fraction of an inch, as $1/16$, from closing, the motor 103 is deenergized and the source of hydraulic pressure is energized by which to utilize hydraulic pressure for completing the closing of the mold and holding it closed under the correct pressure. After the mold filling is completed, and the plastic material has set therein, pressure fluid is urged into the chamber 91 for breaking the mold open. As soon as it is opened, which means merely broken loose from a fully closed position but with the parts separated only a small fraction, as $1/16$ of an inch, the motor 103 is again energized but this time in the reverse direction and the rod 89a is rapidly lifted.

Figures 2, 6, 10, 11:
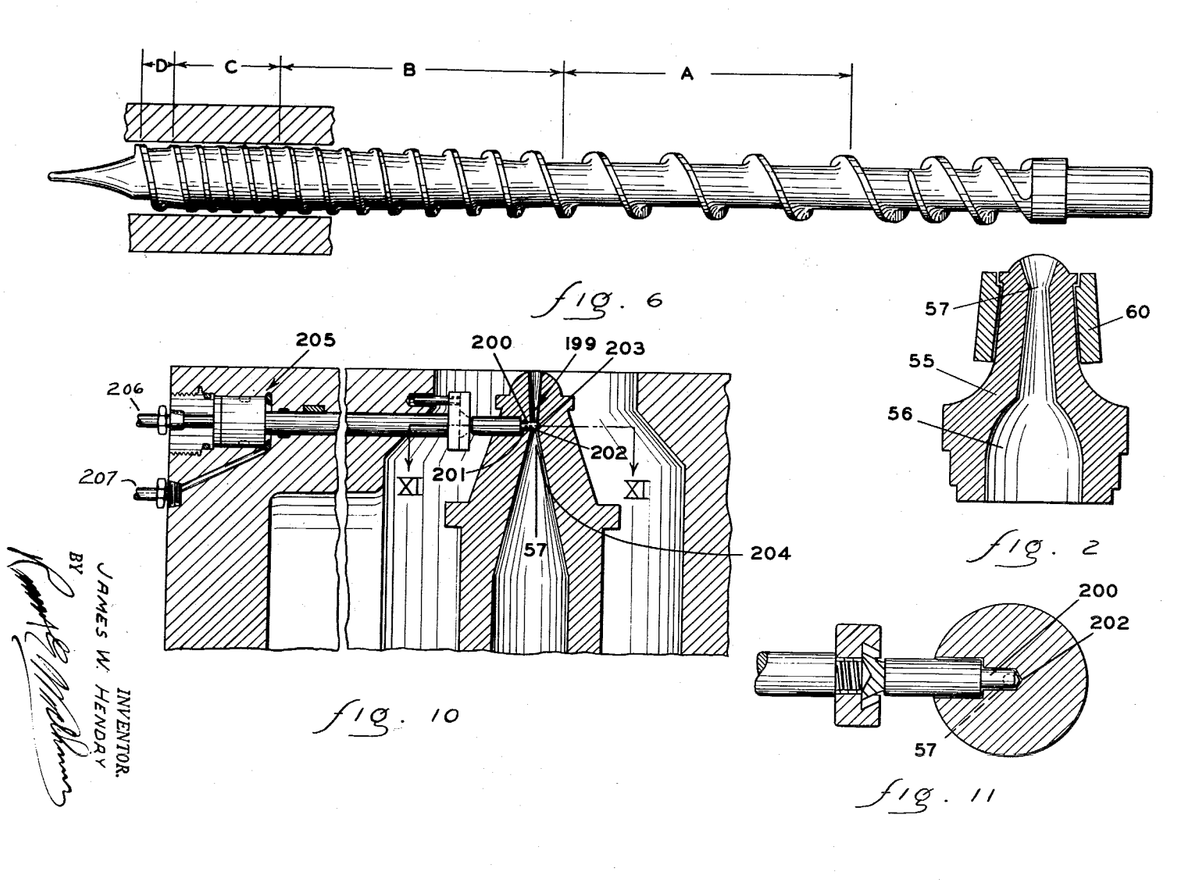
Figure 2 is a detail taken as a central section through the nozzle and the associated heaters.
Figure 6 illustrates a modified screw which can be used in the pre-plasticizing unit.
Figure 10 is a fragmentary view in central vertical section of means which may be used if desired for closing the ejection port of the ram cylinder.
Figure 11 is a section taken on line XI—XI of Figure 10.
Figure 7:
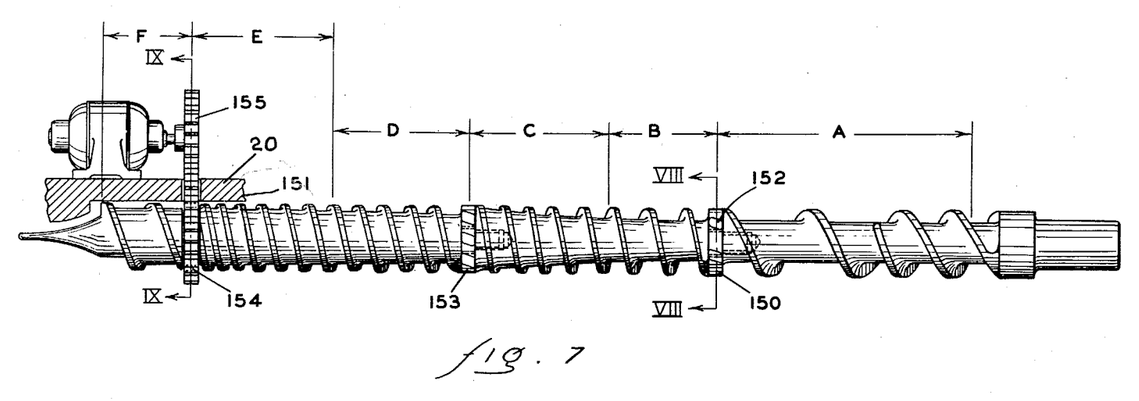
Figure 7 illustrates a further modified screw.

Figures 6 and 7 illustrate alternative forms of screws which may be used in place of the screw illustrated in the other figures. The alternative forms of screws will effect certain different functions and will be used for handling other types of materials as compared with the screw illustrated in the other figures but their use will not change the overall operation of the machine.

Referring particularly to the screw shown in Figure 6, there is provided a zone A of substantially constant root diameter and substantially constant lead, then in zone B there is a gradually enlarging root diameter but there is still maintained the same lead as existed in zone A. Zone C has a substantially constant root diameter but here the lead is very small, sufficiently small that the cross-sectional area provided between the root of the screw and the inner wall of the surrounding cylinder and the opposed surfaces of adjacent screw flights is enough smaller than a similar area in zone A or B that the plastic material will move faster than the surfaces of the screw contacted thereby or, in other words, it will squirt rapidly through the space provided between the flights in zone C, in the same general manner and for the same purposes but with slightly different specific results and, set forth with respect to the screw described and claimed in my application Serial No. 241,577. The zone D has a progressively decreasing root diameter which may or may not decrease to the diameter of zone A. Zone D also has a single, or fractional flight of lead materially greater than that in zone C and approximating the lead of zone A. Thus, the great amount of pressure which is exerted in zone C, of the order of 25 or 30 to 1 with respect to the pressure exerted in zone A, is quickly relieved between zone C and the point of expelling of the plastic material from the extrusion chamber.

The screw shown in Figure 7 has a substantially constant root diameter through zone A, an equal and constant root diameter in zone B, a progressively increasing root diameter through zone C, a constant root diameter through zone D but smaller than the maximum root diameter of zone C, another progressively increasing root diameter in zone E, and a constant root diameter slightly smaller than the maximum root diameter of zone E through zone F. The amounts and purposes of the increase in root diameter are substantially similar to that above described with respect to Figure 6.

Figure 8:
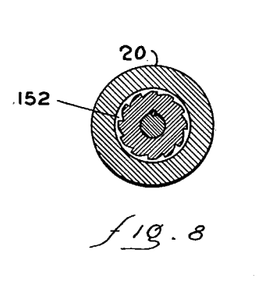
Figure 8 is a section taken on the line VIII—VIII of Figure 7.

Intermediate zones A and B there is provided a breaker plate 150 rotatable with the screw and being of such diameter as to run closely against the inside walls 151 of the plasticizing cylinder 20. As shown in Figure 8, there are provided slots 152 in the edges of said breaker plates of the form shown and the said slots are preferably placed at a small angle to the axis of the screw, as shown in Figure 7. Similar breaker plates are desirably, but not necessarily placed as shown at 153 and 154, but these latter will preferably have progressively larger numbers of teeth as they are placed closer to the discharge end of the screw. For example, plate 150 in one embodiment has nine teeth, plate 153 has eighteen teeth and plate 154 has twenty-four teeth.

The purpose of these breaker plates is to provide a means for the breaking up the material being worked by the screw at points intermediate the ends of the screw in order that highly cohesive materials, such as rubber, will be thoroughly subdivided and mixed.

Figure 9:
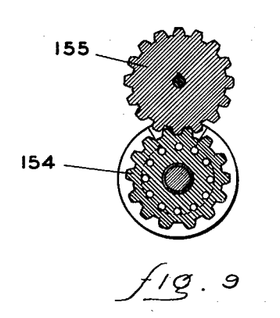
Figure 9 is a section taken on the line IX—IX of Figure 7.

As shown in Figure 9, said breaker plates may also be rotatably independent of the screw and may extend radially outwardly of the walls defining the pre-plasticizing chamber 17 and have gear teeth on their outer periphery. Such gear teeth may be engageable by a motor driven pinion 155 for rotation of said breaker plate at a speed different than, either faster or slower, the speed of rotation of the screw. Thus, the breaking and chopping action effected by said breaker plate will be even more violent than that of the breaker plate 150. It will be apparent in view of the foregoing that the breaker plate of the type shown at 154 may be used in combination with the breaker plates shown at 153 and 150, or all of said breaker plates may be of one style or the other.

While the apparatus herein described is preferably used, as above described, without a torpedo or other obstruction in the ejection nozzle, it will be apparent that in some instances, as with materials of extremely fluid nature, the use of a torpedo may be desirable. Hence, although a part of my invention lies in the fact that a torpedo is not normally necessary, and a free and easy communication from the ram chamber into the mold is accordingly obtained, yet other features of my invention will not be diminished or altered by the use of a torpedo in a conventional manner where same appears desirable in order to build up the required pressure within the ram chamber. Said torpedo may, of course, be fixed or it may be moved as needed, even to the point of completely closing the nozzle during the filling of the ram chamber.

Likewise, where extremely fluid plastics are to be handled, gating structure may be provided to close the nozzle during the period when the ram chamber is being filled. While any of several conventional gating structures may be used, a preferred one will now be described.

Referring to Figures 10 and 11, the gate 199 comprises an elongated bar 200, preferably cylindrical, extends through an opening 201 across the throat 57 of the ejection nozzle. The end 203 of said bar is formed, as sharply tapered, to fit snugly into a suitable recess 202 in the side 204 of the throat 57 which is opposite to the opening 201. A suitable source of energy for reciprocating said bar is affixed thereto as the power cylinder 205. Said power cylinder may advantageously be a hydraulic cylinder which is connected to close the gate 199 at a desired time, such as the commencement of downward movement of the ram 42 and is further connected to retract said gate simultaneously with the commencement of upward movement of the ram 42. Said connections 206 and 207 (Figure 10) may be to the lines 137 and 138, respectively which move said ram and hence the movement of said gate will require no further control.

It will be understood, of course, that the gate here shown and described is illustrative only and not limiting.

Accordingly, I have described herein a machine capable of meeting the objects and purposes above set forth.

While a specific embodiment of this machine has been here utilized for illustrative purposes, it will be understood that variations therefrom may be made within the terms of the hereinafter appended claims except as said claims by their own terms expressly require otherwise.

I claim:

1. In a plastic injection machine, the combination comprising: a horizontal base member; a ram chamber housing mounted directly on said base having a mold-receiving, upwardly directed, nozzle at the upper end thereof, a vertical ram chamber therein and an upwardly and downwardly moving ram in said ram chamber; a pre-plasticizing unit positioned adjacent said ram chamber housing and having a pre-plasticizing chamber communicating with said ram chamber through an opening in the side of said ram chamber housing, said pre-plasticizing unit including plastic supply means at a point thereon spaced from its point of discharge into said ram chamber and a screw within said pre-plasticizing chamber for working said plastic material and simultaneously conveying it from said pre-plasticizing chamber to said ram chamber; means supporting said pre-plasticizing unit directly onto said base for holding same in a substantially predetermined position with respect to said ram chamber housing; a plurality of strain rods positioned about said ram chamber and extending thereabove and supported directly on said base; a lower mold supporting platen supported on said strain rods adjacent said nozzle; an upper mold supporting platen and means supporting same upon the upper ends of said strain rods for movement toward and away from said lower mold supporting platen.

2. In a plastic injection machine, the combination comprising: a horizontal base unit comprising an upper plate, a lower plate and a plurality of side and end plates; means defining an opening in said upper plate; a housing defining a vertical ram chamber extending vertically through said opening with a vertically directed discharge port at its upper end, and means securing said housing fixedly to said upper plate; a pre-plasticizing unit positioned adjacent said ram chamber housing and having a pre-plasticizing chamber communicating with said ram chamber through an opening in the side of said ram chamber housing, said pre-plasticizing unit including plastic supply means at a point thereon spaced from its point of discharge into said ram chamber and a screw within said pre-plasticizing chamber for working said plastic material and simultaneously conveying it from said pre-plasticizing chamber to said ram chamber; means supporting said pre-plasticizing unit directly and fixedly onto said base; a plurality of strain rods positioned about said ram chamber and extending thereabove and supported directly on said base; a lower mold supporting platen adjustably supported on said strain rods adjacent said discharge port in fixed position with respect thereto; an upper mold supporting platen and means supporting same upon the upper ends of said strain rods for movement toward and away from said lower mold supporting platen.

3. Apparatus defined in claim 1 wherein the point of communication between said pre-plasticizing chamber and said ram chamber is immediately above said ram when same is in its lowermost position.

4. The apparatus defined in claim 1 having in addition: a pair of micro-switches spaced from each other in a direction parallel to the axis of said ram; means movable with said ram for engaging first one and then the other of said micro-switches when said ram moves from one position to another, such engagement occurring only when the upper end of said ram is below the point of communication between said chambers; means normally supporting said ram in the first of said positions and said means permitting said ram to move axially downwardly to the other of said positions under the weight of plastic material in said ram chamber when same is substantially filled; means controlled by said micro-switches causing said screw to commence turning upon the closing of the first of said switches and causing said screw to stop turning and said ram to move upwardly upon the closing of the other of said switches.

5. In a plastic injection machine, the combination comprising: a horizontal base member; a ram housing rigidly secured to said base and having an upwardly directed nozzle at the upper end thereof, a vertical ram chamber within said housing communicating with said nozzle and a vertically reciprocable ram in said chamber; a pre-plasticizing unit secured directly upon said base and independently of said ram housing and having a pre-plasticizing chamber communicating with said ram chamber intermediate its ends; plastic supply means communicating with said pre-plasticizing chamber and means therewithin for working said plastic and advancing it into said ram chamber; a first mold supporting platen and means supporting same directly upon said base adjacent to said nozzle and substantially fixedly with respect thereto; a second mold supporting platen supported upon said means supporting said first platen, said second platen being positioned above said first platen and being vertically movable toward and away from said first platen.

6. The apparatus of claim 5 wherein the operation position of said first platen is adjustable toward and away from said nozzle.

7. The apparatus of claim 5 wherein the communication point between said pre-plasticizing and ram chambers is located immediately above the upper end of said ram when it is in retracted position.

8. The apparatus of claim 5 wherein said base member is sufficiently rigid to prevent appreciable, relative movement between said injection housing and said pre-plasticizing unit during operation of said machine.

9. The apparatus of claim 5 wherein the means for working and advancing said plastic is a screw.

10. The apparatus of claim 5 wherein the means supporting said first and second platens is a plurality of vertically arranged, parallel, strain rods secured to said horizontal base member.

11. In a plastic injection machine, the combination comprising: a base including an upper horizontally disposed plate; means defining an opening in said upper plate; a housing defining a vertical ram chamber extending vertically through said opening with a vertically directed discharge port at the upper end of said chamber and means securing said housing fixedly with respect to said upper plate; a preplasticizing unit positioned adjacent said ram chamber housing and having a preplasticizing chamber communicating with said ram chamber through an opening in the side of said ram chamber housing, said preplasticizing unit including plastic supply means at a point thereon spaced from its point of discharge into said ram chamber and means within said preplasticizing chamber for working said plastic material and for conveying it from said preplasticizing chamber to said ram chamber; means supporting said preplasticizing unit directly onto said base; a plurality of strain rods positioned about said ram chamber and extending thereabove and supported directly on said base; a lower mold supporting platen supported on said strain rods adjacent said discharge port; an upper mold supporting platen and means supporting same upon said strain rods for movement toward and away from said lower mold supporting platen.

12. In a plastic injection machine, the combination comprising: a base including an upper horizontally disposed plate; means defining an opening in said upper plate; a housing defining a vertical ram chamber extending vertically through said opening with a vertically directed discharge port at the upper end of said chamber and means securing said housing fixedly with respect to said upper plate; a preplasticizing unit positioned adjacent said ram chamber housing and having a preplasticizing chamber communicating with said ram chamber through an opening in the side of said ram chamber housing, said preplasticizing unit including plastic supply means at a point thereon spaced from its point of discharge into said ram chamber and means within said preplasticizing chamber for working said plastic material and for conveying it from said preplasticizing chamber to said ram chamber; means supporting said preplasticizing unit directly onto said base; a plurality of strain rods positioned about said ram chamber and extending thereabove and supported directly on said base; a lower mold supporting platen supported on said strain rods adjacent said discharge port; an upper mold supporting platen and means supporting same upon said strain rods for movement toward and away from said lower mold supporting platen; and an automatically operated, horizontally reciprocable, elongated bar for blocking and unblocking said discharge port in predetermined relationship with the reciprocation of said ram.

13. In a plastic injection machine, the combination comprising: a base including an upper horizontally disposed plate; means defining an opening in said upper plate; a housing defining a vertical ram chamber extending vertically through said opening with a vertically directed discharge port at the upper end of said chamber and means securing said housing fixedly with respect to said upper plate; a preplasticizing unit positioned adjacent said ram chamber housing and having a preplasticizing chamber communicating with said ram chamber through an opening in the side of said ram chamber housing, said preplasticizing unit including plastic supply means at a point thereon spaced from its point of discharge into said ram chamber and a screw within said preplasticizing chamber for working said plastic material and for conveying it from said preplasticizing chamber to said ram chamber, said screw having an intermediate portion of sufficiently increased root diameter with respect to the end portions thereof that material will squirt therethrough at a rate of speed faster than the speed of the surface of the said intermediate portion of the screw; means supporting said preplasticizing unit directly onto said base; a plurality of strain rods positioned about said ram chamber and extending thereabove and supported directly on said base; a lower mold supporting platen supported on said strain rods adjacent said discharge port; an upper mold supporting platen and means supporting same upon said strain rods for movement toward and away from said lower mold supporting platen.

14. In a plastic injection machine, the combination comprising: a base including an upper horizontally disposed plate; means defining an opening in said upper plate; a housing defining a vertical ram chamber extending vertically through said opening with a vertically directed discharge port at the upper end of said chamber and means securing said housing fixedly with respect to said upper plate; a preplasticizing unit positioned in predetermined relationship with respect to said ram chamber housing and having a preplasticizing chamber communicating with said ram chamber through an opening in the side of said ram chamber housing, said preplasticizing unit including plastic supply means at a point thereon spaced from its point of discharge into said ram chamber and means within said preplasticizing chamber for working said plastic material and for conveying it from said preplasticizing chamber to said ram chamber; means supporting said preplasticizing unit directly onto said base; a plurality of strain rods positioned about said ram chamber and extending thereabove and supported fixedly with respect to said base; a lower mold supporting platen supported on said strain rods adjacent said discharge port; an upper mold supporting platen and means supporting same upon said strain rods for movement toward and away from said lower mold supporting platen.

15. In a plastic injection machine, the combination comprising: a horizontal base member; a vertically arranged ram housing rigidly secured to said base with its upper end above at least the portion of said base by which said ram housing is supported and having an upwardly directed discharge port at the upper end thereof, a vertical ram chamber within said housing communicating with said discharge port and a vertically reciprocable ram in said chamber; a preplasticizing unit secured upon said base and independently of said ram housing and having a preplasticizing chamber communicating with said ram chamber intermediate its ends; plastic supply means communicating with said preplasticizing chamber and means therewithin for working said plastic and advancing it into said ram chamber; a first mold supporting platen and means including vertically positioned rods supporting same directly upon said base adjacent to said discharge port and fixedly with respect thereto; a second mold supporting platen supported upon said rods and said second platen being positioned above said first platen; a clamp cylinder supported on said rods for vertically moving said second platen toward and away from said first platen.

16. In a plastic injection machine, the combination comprising: a horizontal base member; a vertically arranged ram housing rigidly secured to said base with its upper end extending through the upper surface of said base and having an upwardly directed discharge port at the upper end thereof, a vertical ram chamber within said housing communicating with said discharge port and a vertically reciprocable ram in said chamber; a preplasticizing unit secured upon said base and independently of said ram housing and having a preplasticizing chamber communicating with said ram chamber intermediate its ends; plastic supply means communicating with said preplasticizing chamber and means therewithin for working said plastic and advancing it into said ram chamber; a first mold supporting platen and means supporting same directly upon said base adjacent to said discharge port and fixedly with respect thereto; a second mold supporting platen supported upon said means supporting said first platen, said second platen being positioned above said first platen and being vertically movable toward and away from said first platen.

17. In a plastic injection machine, the combination comprising: a horizontal base member; a vertically arranged ram housing rigidly secured to, and at least partially within, said base with its upper end extending through the upper surface of said horizontal base member and having an upwardly directed discharge port at the upper end thereof, a vertical ram chamber within said housing communicating with said discharge port and a vertically reciprocable ram in said chamber; a preplasticizing unit secured upon said base and independently of said ram housing and having a preplasticizing chamber communicating with said ram chamber intermediate its ends; plastic supply means communicating with said preplasticizing chamber and means therewithin for working said plastic and advancing it into said ram chamber; a first mold supporting platen and means supporting same directly upon said base adjacent to said discharge port and fixedly with respect thereto; a second mold supporting platen supported upon said means supporting said first platen, said second platen being positioned above said first platen and being vertically movable toward and away from said first platen.

18. In a plastic injection machine, the combination comprising: a horizontal base member; a housing defining a vertical ram chamber extending above said base member with a vertically directed discharge port at the upper end of said chamber and means securing said housing fixedly to said base member; a preplasticizing unit positioned adjacent said ram chamber housing and having a preplasticizing chamber communicating with said ram chamber through an opening in the side of said ram chamber housing, said preplasticizing unit including plastic supply means at a point thereon spaced from its point of discharge into said ram chamber and means within said preplasticizing chamber for working said plastic material and for conveying it from said preplasticizing chamber to said ram chamber; means supporting said preplasticizing unit onto said base; a plurality of strain rods positioned about said ram chamber and extending thereabove and supported directly on said base; a lower mold supporting platen adjustably supported on said strain rods adjacent said discharge port in fixed position with respect thereto; an upper mold supporting platen and means supporting same upon said strain rods for movement toward and away from said lower mold supporting platen.

19. In a plastic injection machine, the combination comprising: a horizontal base member; a vertically arranged ram housing rigidly secured to said base with its upper end above at least the portion of said base by which said ram housing is supported and having an upwardly directed discharge port at the upper end thereof, a vertical ram chamber within said housing communicating with said nozzle and a vertically reciprocable ram in said chamber; a preplasticizing unit secured upon said base and independently of said ram housing and having a preplasticizing chamber communicating with said ram chamber intermediate its ends; plastic supply means communicating with said preplasticizing chamber and a screw therewithin for working said plastic and advancing it into said ram chamber, said screw having an intermediate portion of sufficiently increased root diameter with respect to the end portions thereof that material will squirt therethrough at a rate of speed faster than the speed of the surface of the said intermediate portion of the screw; a first mold supporting platen and means including vertically positioned rods supporting same directly upon said base adjacent to said discharge port and fixedly with respect thereto; a second mold supporting platen supported upon said rods and said second platen being positioned above said first platen; a clamp cylinder supported on said rods for vertically moving said second platen toward and away from said first platen.

20. In a plastic injection machine, the combination comprising: a horizontal base member; a vertically arranged ram housing rigidly secured to said base with its upper end above at least the portion of said base by which said ram housing is supported and having an upwardly directed discharge port at the upper end thereof, a vertical ram chamber within said housing communicating with said discharge port and a vertically reciprocable ram in said chamber; a preplasticizing unit secured directly upon said base and independently of said ram housing and having a preplasticizing chamber communicating with said ram chamber intermediate its ends; plastic supply means communicating with said preplasticizing chamber and means therewithin for working said plastic and advancing it into said ram chamber, a first mold supporting platen and means supporting same directly upon said base adjacent to said discharge port; a second mold supporting platen supported upon said means supporting said first platen, said second platen being positioned above said first platen and being vertically movable toward and away from said first platen.

21. In a plastic injection machine, the combination comprising: a horizontal base member; a vertically arranged ram housing rigidly secured to said base with its upper end above at least the portion of said base by which said ram housing is supported and having an upwardly directed discharge port at the upper end thereof, a vertical ram chamber within said housing communicating with said discharge port and a vertically reciprocable ram in said chamber; a preplasticizing unit secured directly upon said base and independently of said ram housing and having a preplasticizing chamber therein, means providing communication from said preplasticizing chamber to said ram chamber between the ends of said ram chamber; plastic supply means communicating with said preplasticizing chamber and means for working said plastic into a moldable condition in said preplasticizing chamber and for advancing it into said ram chamber; a first mold supporting platen and means supporting same directly upon said base adjacent to said discharge port; a second mold supporting platen supported above said first platen and being vertically movable toward and away from said first platen.

22. In a plastic injection machine, the combination comprising: a horizontal base unit comprising an upper plate, a lower plate and a plurality of side and end plates; means defining an opening in said upper plate; a housing defining a vertical ram chamber extending vertically through said opening with a vertically directed discharge port at its upper end, and means securing said housing fixedly to said upper plate; a preplasticizing unit positioned adjacent said ram chamber housing and having a preplasticizing chamber communicating with said ram chamber through an opening in the side of said ram chamber housing, said preplasticizing unit including plastic supply means at a point thereon spaced from its point of discharge into said ram chamber and a screw within said preplasticizing chamber for working said plastic material and simultaneously conveying it from said preplasticizing chamber to said ram chamber, said screw having an intermediate portion of sufficiently increasing root diameter with respect to the end portions thereof that material squirts through its flights at a speed faster than the speed of the surface of said intermediate portion of the screw; means supporting said preplasticizing unit fixedly onto said base; a plurality of strain rods positioned about said ram chamber and extending thereabove and supported directly on said base; a lower mold supporting platen adjustably supported on said strain rods adjacent said discharge port in fixed position with respect thereto; an upper mold supporting platen and means supporting same upon the upper ends of said strain rods for movement toward and away from said lower mold supporting platen.

References Cited in the file of this patent

UNITED STATES PATENTS

| | | |
|---|---|---|
| 791,649 | Richards | June 6, 1905 |
| 2,159,559 | Lawyer | May 23, 1939 |
| 2,262,615 | Lester | Nov. 11, 1941 |
| 2,266,729 | Anderson | Dec. 23, 1941 |
| 2,332,829 | Parsons et al. | Oct. 26, 1943 |
| 2,359,840 | Goessling | Oct. 10, 1944 |
| 2,367,204 | Cousino | Jan. 16, 1945 |
| 2,465,889 | Lester et al. | Mar. 29, 1949 |
| 2,473,506 | Bullard | June 21, 1949 |
| 2,493,805 | Dinzl | Jan. 10, 1950 |
| 2,499,235 | Tyson | Feb. 28, 1950 |
| 2,501,595 | Bohannon | Mar. 21, 1950 |
| 2,514,884 | Maynard | July 11, 1950 |